United States Patent [19]
Hansson

[11] 4,074,583
[45] Feb. 21, 1978

[54] COMPOSITE EPICYCLIC GEAR RING AND METHOD OF MANUFACTURE

[75] Inventor: Hans-Erik Hansson, Finspong, Sweden

[73] Assignee: Stal-Laval Turbin AB, Finspong, Sweden

[21] Appl. No.: 748,781

[22] Filed: Dec. 7, 1976

[30] Foreign Application Priority Data

Dec. 9, 1975 Sweden ................................ 7513832

[51] Int. Cl.² ................................................ F16H 1/06
[52] U.S. Cl. .................................... 74/413; 29/159 R
[58] Field of Search ................. 74/432, 439, 446, 413, 74/443, 461; 29/159 R

[56] References Cited

U.S. PATENT DOCUMENTS

| | | | |
|---|---|---|---|
| 2,753,731 | 7/1956 | McWethy | 74/413 X |
| 3,960,209 | 6/1976 | Neubrand | 74/446 X |

FOREIGN PATENT DOCUMENTS

| | | |
|---|---|---|
| 2,438,331 | 2/1976 | Germany. |

*Primary Examiner*—Leonard H. Gerin
*Attorney, Agent, or Firm*—Pollock, Vande Sande & Priddy

[57] ABSTRACT

An improved gear ring for epicyclic gear trains is formed from a plurality of concentric ring elements shrink fitted to each other, whereby increased flexibility is achieved without increasing stress levels in the ring. The ring elements may be separated by a layer of elastomeric material having a low modulus of elasticity. A method of making such a gear ring is disclosed.

4 Claims, 8 Drawing Figures

COMPOSITE EPICYCLIC GEAR RING AND METHOD OF MANUFACTURE

BACKGROUND OF THE INVENTION

The stiffness of an inner toothed ring in an epicyclic gear is usually considered in combination with the stiffness of the teeth of the ring. Thus, any significant deviation from an ideal tooth geometry substantially increases the load on the surrounding ring material in proportion to the stiffness of the ring. For a conventional inner toothed ring of the type used in epicyclic gear trains, efforts to reduce stiffness of the ring are limited by the resultant material stress levels in the ring.

OBJECTIONS OF THE INVENTION

An object of the invention is to provide an improved inner toothed gear ring for use in epicyclic gear trains which is capable of greater radial deflection under loading, without excessively high stress levels.

Another object of the invention is to provide an improved method of making such gear rings.

These objects of the invention are given only by way of example. Thus, other desirable objects and advantages inherently achieved by the invention may be apparent to those skilled in the art upon reading this disclosure. Nonetheless, the scope of the invention is to be limited only by the appended claims.

SUMMARY OF THE INVENTION

The above objects and other desirable advantages are achieved by the gear ring according to the invention, which includes a plurality of concentric ring elements clamped together by shrink fitting. The resultant composite ring gear is capable of increased deflection without exceeding the stress levels found in a conventional single element gear of similar overall size. To provide additional flexibility, some embodiments include a layer of elastomeric material between ring elements.

In the method of the invention, the concentric ring elements shrink-fitted to each other prior to machining the gear teeth. Where an elastomeric layer is to be provided, one ring element is provided with a pair of spaced, radially projecting flanges which separate it from the surrounding ring element to define an open volume. This volume is filled with an elastomeric material of low modulus of elasticity and then the flanges are machined away, leaving the elastomeric material between the two ring elements.

Figure 1:
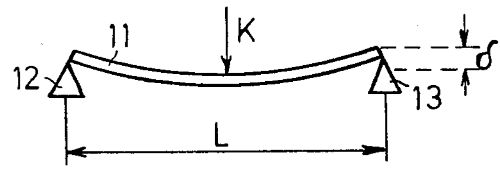
FIG. 1 illustrates an analytical representation of a segment of a prior art toothed ring of an epicyclic gear, showing loading and deflection.
Figure 1A:
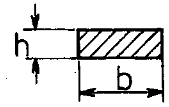

FIG. **1*a* shows a cross-section of the segment illustrated in FIG. 1*a***.

Figure 2:
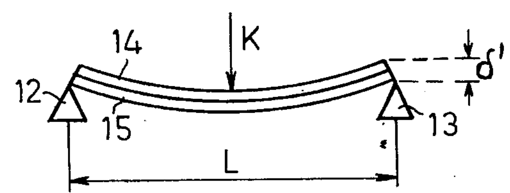

FIG. 2 illustrates an analytical representation of a segment of a toothed ring according to the invention, also showing loading and deflection.

Figure 2A:
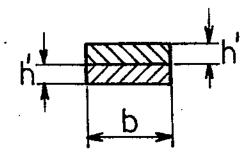

FIG. **2*a* shows a cross-section of the segment illustrated in FIG. 2*a***.

Figures 3, 3A:
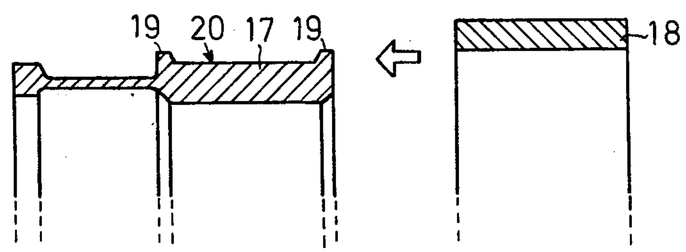
Figure 4:
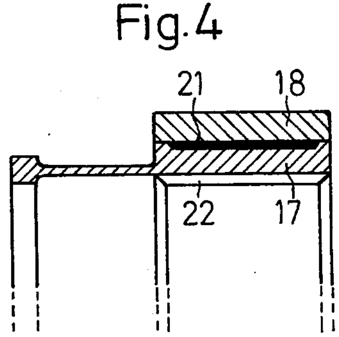
Figure 5:
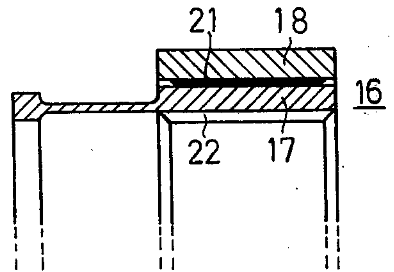

FIGS. 3 to 5 illustrate sequential steps in the assembly of one embodiment of the invention having an elastomeric layer between ring elements.

DETAILED DESCRIPTION OF THE PREFERRED EMBODIMENTS

There follows a detailed description of the preferred embodiments of the invention, reference being had to the drawing in which like reference numerals identify like elements of structure in each of the several Figures.

With a certain approximation, an inner toothed ring can be regarded as shown in FIG. 1, as a simply supported beam 11 having the dimensions shown in FIG. **1*a*. The beam 11 is deflected by a force K which corresponds to the radial force component exerted on the ring during engagement of its teeth. Beam 11 rests on the bases 12 and 13** spaced a distance L from each other where length L corresponds to the pitch between the planet wheels of the epicyclic gear (not shown), as measured along the circumference of the toothed ring. The force K gives rise to a deformation $\delta$. The stress $\sigma$ generated in the ring may be expressed as:

$$\sigma = (M \cdot y)/I \quad (1)$$

where $y = h/2$, $I = (b \cdot h^3)/12$ and $M = K \cdot (L/4)$. This expression for the stress may be simplified to:

$$\sigma = K \cdot (L/h^2) \cdot C_1 \quad (2)$$

where $C_1 = 3/(2b)$, a constant. It then follows that the ring stress can be expressed as:

$$\sigma = (1/h^2) \cdot C_2 \quad (3)$$

where $C_2 = 3KL/2b$, a constant.

According to the invention, two or more ring elements are assembled concentrically to form an inner toothed ring as one unit, which has improved flexibility relative to the ring shown in FIGS. 1 and **1*a*. In FIG. 2, it is assumed that two concentric rings form one inner toothed ring. These concentric rings are represented by two beams 14 and 15 arranged in parallel and loaded with the same force K applied in the FIG. 1*a* analysis. In FIG. 2*a*, the cross-sections through the beams 14 and 15 are seen to have dimensions $h'$ and $b$. The load applied to beams 14 and 15** is divided between them so that the stress $\sigma'$ generated in each beam is:

$$\sigma' = (K/2) \cdot (L/h'^2) \cdot C_1; \quad (4)$$

or $$\sigma' = [1/(2h'^2)] \cdot C_2. \quad (5)$$

Thus, for $\sigma$ to be equal to $\sigma'$, the following conditions will exist:

$$1/h^2 = 1/(2h'^2);$$

that is, $$h' = (1/\sqrt{2})\, h. \quad (6)$$

For the deformation $\delta$ shown in FIG. **1*a***, the following applies:

$$\delta = (M \cdot L^3)/48\, EI = K \cdot (L^2/h^3) \cdot C_3, \quad (7)$$

where $C_3$ is a constant and $E$ designates the modulus of elasticity. Thus, for the force K and length L, $\delta$ can be expressed as $$\delta = \sigma \cdot (1/h) \cdot C_4, \quad (8)$$

where $C_4$ is a constant.

If $h' = h/\sqrt{2}$, the following applies:

$$\delta' = \sqrt{2}\delta. \quad (9)$$

Analogous reasoning may be applied in the case of $n$ ring elements joined together to form a single inner toothed ring. For $n$ ring elements, the following applies:

$$h' = h/\sqrt{n}; \quad (10)$$

so that, $$\delta' = \sqrt{n}\delta, \quad (11)$$

to provide the same stress $\sigma$ in a toothed ring made up of $n$ ring elements as in a toothed ring made of a single element. Since the same stress levels are produced under the same loading in the two cases, but with the deflection being larger in the case of the composite ring, it is apparently desirable to combine a plurality of concentric ring elements to build up a composite inner toothed ring. The composite ring has a greater elasticity and thus reduces additional loads in the gear.

In FIGS. 3, **3*a*, 4 and 5, there are illustrated the various process steps for building up an inner toothed ring 16 which comprises two concentric ring elements 17 and 18. Ring element 18 has the larger diameter so that it may be applied to the smaller ring element 17 by shrink fitting. A peripheral slot 20 is provided in the ring element 17 between a pair of spaced, radially extending flanges 19. After element 18 has been shrink fitted over flanges 19, a compound 21 having a low modulus of elasticity such as rubber or a thermosetting resin is forced into slot or volume 20 until the compound 21 fills volume 20 out to flanges 19. Thereafter, the compound 21 is allowed to solidify under cooling or hardening. After this, the tooth 22 in the inner ring element 17 is machined since the assembly is considerably stiffer while flanges 19 are still in place. The flanges 19 are then machined away to leave the configuration shown in FIG. 5. Flanges 19 may extend completely around the periphery of ring 17** or only along a portion thereof, as desired.

To reduce further the effect of the ring stress on the tooth stresses in the inner toothed ring, the inner ring may advantageously be made somewhat thinner and more flexible than the remaining rings. The cross-sectional areas may be defined by the relationship $hbn^{-1/2}$, for each ring element, where $h$ and $b$ are the radial thickness of a theoretical single element ring having the same stress level under a given load as the stress level in each concentric ring element of a composite ring. Although this is the preferred relationship, other composite ring arrangements may be used without departing from the scope of the invention.

Having described my invention in sufficient detail to enable those skilled in the art to make and use it, I claim:

1. An inner-toothed ring for an epicyclic gear comprising a plurality of concentric ring elements arranged one within the other and clamped together by shrink fitting one ring to another, the average cross-sectional area of the concentric ring elements being about $hbn^{-1/2}$, where $n$ is the number of ring elements and $h$ and $b$ are the radial thickness and width of a theoretical single element ring which has the same stress level under radial loading as each one of said plurality of concentric ring elements in a ring having $n$ concentric ring elements.

2. An inner toothed ring according to claim 1, wherein the inner-most of said plurality of concentric ring elements is smaller in cross-sectional area than any one of the rings surrounding it, whereby tooth stresses in said ring are reduced.

3. An inner toothed ring according to claim 1, further comprising a layer of elastomeric material having a low modulus of elasticity arranged between at least two of said plurality of ring elements.

4. A method of making an inner-toothed epicyclic gear which is formed of at least two ring elements, an outer one of which is tightly secured to an inner ring comprising the method steps of:

forming on an inner of the ring elements a pair of spaced radially extending circumferential flanges, shrink fitting the outer of said ring elements on the inner ring element to define in the space between said rings an annular volume which extends axially corresponding to the spacing between said flanges, filling said volume with an elastomeric material having a low modulus of elasticity, machining teeth in said inner ring, and removing said flanges from said inner ring after said machining step.

* * * * *